United States Patent
Ha et al.

(10) Patent No.: US 10,298,786 B2
(45) Date of Patent: May 21, 2019

(54) METHOD FOR PERFORMING JOB BY USING WIDGET, AND IMAGE FORMING APPARATUS FOR PERFORMING THE SAME

(71) Applicant: HP PRINTING KOREA CO., LTD., Suwon-si, Gyeonggi-do (KR)

(72) Inventors: Kwang-soo Ha, Seoul (KR); Se-young Kim, Yongin-si (KR); Hyuck Kim, Yongin-si (KR); Se-rrah Lim, Bucheon-si (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 219 days.

(21) Appl. No.: 14/790,320

(22) Filed: Jul. 2, 2015

(65) Prior Publication Data

US 2016/0182748 A1 Jun. 23, 2016

(30) Foreign Application Priority Data

Dec. 23, 2014 (KR) ......................... 10-2014-0187559

(51) Int. Cl.
| | |
|---|---|
| G06F 3/048 | (2013.01) |
| H04N 1/00 | (2006.01) |
| G06F 3/0484 | (2013.01) |
| G06F 3/0482 | (2013.01) |
| G06F 3/0488 | (2013.01) |
| G06F 3/0481 | (2013.01) |

(52) U.S. Cl.
CPC ....... *H04N 1/00411* (2013.01); *G06F 3/0482* (2013.01); *G06F 3/0488* (2013.01); *G06F 3/04817* (2013.01); *G06F 3/04847* (2013.01); *H04N 1/0044* (2013.01); *H04N 1/00477* (2013.01); *H04N 2201/0091* (2013.01); *H04N 2201/0094* (2013.01)

(58) Field of Classification Search
CPC ... G06F 3/048; H04N 1/0044; H04N 1/00477
See application file for complete search history.

(56) References Cited

U.S. PATENT DOCUMENTS

| | | | |
|---|---|---|---|
| 2008/0077620 A1* | 3/2008 | Gilley | G06F 19/3406 |
| 2010/0095295 A1* | 4/2010 | Harada | G06F 3/1204 |
| | | | 717/176 |
| 2011/0029930 A1* | 2/2011 | Watanabe | G06F 9/4843 |
| | | | 715/846 |
| 2011/0055720 A1* | 3/2011 | Potter | G06F 3/017 |
| | | | 715/747 |
| 2012/0069393 A1* | 3/2012 | Shoji | H04N 1/00448 |
| | | | 358/1.15 |

(Continued)

OTHER PUBLICATIONS

Yuri Kim, "Print without PC . . . Samsung released Smart Multi-function Copiers", Asia Business Daily, dated Jul. 3, 2014, 1 page.

*Primary Examiner* — Xuyang Xia
(74) *Attorney, Agent, or Firm* — Staas & Halsey LLP

(57) ABSTRACT

Provided is a method of performing a job by using a widget. The method includes, in a widget including a button for a start of a predetermined job, receiving an input of selection of the button, displaying a progress of the job on the widget if the job is started in response to the input, and changing a state of the widget to an initial state if the job is completed.

20 Claims, 21 Drawing Sheets

(56) References Cited

U.S. PATENT DOCUMENTS

| | | | |
|---|---|---|---|
| 2013/0290902 A1* | 10/2013 | Martin | D06F 39/005 715/823 |
| 2014/0149894 A1* | 5/2014 | Watanabe | G06F 3/0481 715/761 |
| 2015/0070726 A1* | 3/2015 | Umezawa | H04N 1/00416 358/1.15 |
| 2015/0143299 A1* | 5/2015 | Kim | G06F 3/0482 715/835 |
| 2015/0350147 A1* | 12/2015 | Shepherd | H04L 51/24 715/752 |

* cited by examiner

METHOD FOR PERFORMING JOB BY USING WIDGET, AND IMAGE FORMING APPARATUS FOR PERFORMING THE SAME

CROSS-REFERENCE TO RELATED APPLICATIONS

This application claims the priority benefit of Korean Patent Application No. 10-2014-0187559, filed on Dec. 23, 2014, in the Korean Intellectual Property Office, the disclosure of which is incorporated herein in its entirety by reference.

BACKGROUND

1. Field

One or more exemplary embodiments relate to a method of performing a job by using a widget and an image forming apparatus for performing the same.

2. Description of the Related Art

A widget is a mini application which is one of graphic user interfaces (GUI) which smoothly support interaction between a user and an application or an operating system, and is a small-sized application containing useful functions and various information sets.

Recently, even office equipment such as a printer has a display panel where a GUI screen is displayed, and thus an environment where a widget, which is displayed on the GUI screen, may be used in performing a specific job, has been prepared.

SUMMARY

One or more exemplary embodiments include a method of performing a job by using a widget and an image forming apparatus for performing the same.

According to one or more exemplary embodiments, a method of performing a job by using a widget includes: receiving an input of selection of a button for start of the job in the widget; displaying a progress of the job on the widget when the job is started in response to the input; and changing a state of the widget to an initial state when the job is completed.

The displaying of the progress of the job may include changing the button for the start of the job to a button for a stop of the job and displaying a completion rate of the job on the changed button.

The widget may include a setting display area of a setting value of an option item related with the performance of the job.

If the setting display area included in the widget is touched, the setting value may be changed.

The widget may further include a menu button for entering a menu for changing the setting value.

A widget may include a setting display area and a setting value for at least one option item which has been selected in advance from among a plurality of option items related with the performance of the job which may be displayed on the widget.

The widget may further include a guide screen where at least one of an image or a text which guides the performance of the job is displayed.

When the job includes at least two operations, if one of the operations of the job is completed, at least one of an image or a text which guides the method of performing a next operation of the job may be displayed on the guide screen.

The widget may further include a preview screen which shows the progress of the job in real time.

Performing an additional job may be available on the preview screen when the job is completed.

According to one or more exemplary embodiments, an image forming apparatus may include: an operation panel configured to display a graphic user interface (GUI) screen for operation control of the image forming apparatus and receive an input of a user; a controller configured to control a display of the GUI screen and to control operation of the image forming apparatus according to the input of the user which is received through the operation panel; and an image forming job performance unit configured to perform the image forming job according to control of the controller, wherein the controller controls the display to display a widget for performing the job which is displayed on the GUI screen, and wherein if the input of the user to start the job is received through the widget, the controller transmits a command to perform the job to the image forming job performance unit and the controller may control the display to display a progress of the job on the widget.

The widget may include a button for a start of the job, wherein the controller may control the display to change the button for the start of the job to a button for a stop of the job and the controller may control the display to display a completion rate of the job on the changed button.

The controller may control the display to display a setting value of an option item related with the performance of the job on the widget.

The controller may change the setting value when an area where the setting value displayed on the widget is touched.

The controller may control the display to display a setting value for at least one option item and the controller may control the display to display the setting value for at least one option item which has been selected in advance from among a plurality of option items related with the performance of the job on the widget.

The controller may control the display to display a guide screen including at least one of an image or a text which guides the performance of the predetermined job on the widget.

When the job is includes two or more operations, if one of the operations is completed, the controller may control the display to display a guide screen including at least one of an image or a text which guides the performance of a next operation of the job on the widget.

The controller may control the display to display a preview screen which shows a progress of the job in real time.

The controller may display a menu for performing an additional job on the preview screen when the job is completed.

In an aspect of one or more embodiments, there is provided at least one non-transitory computer readable medium storing computer readable instructions which when executed implement methods of one or more embodiments.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
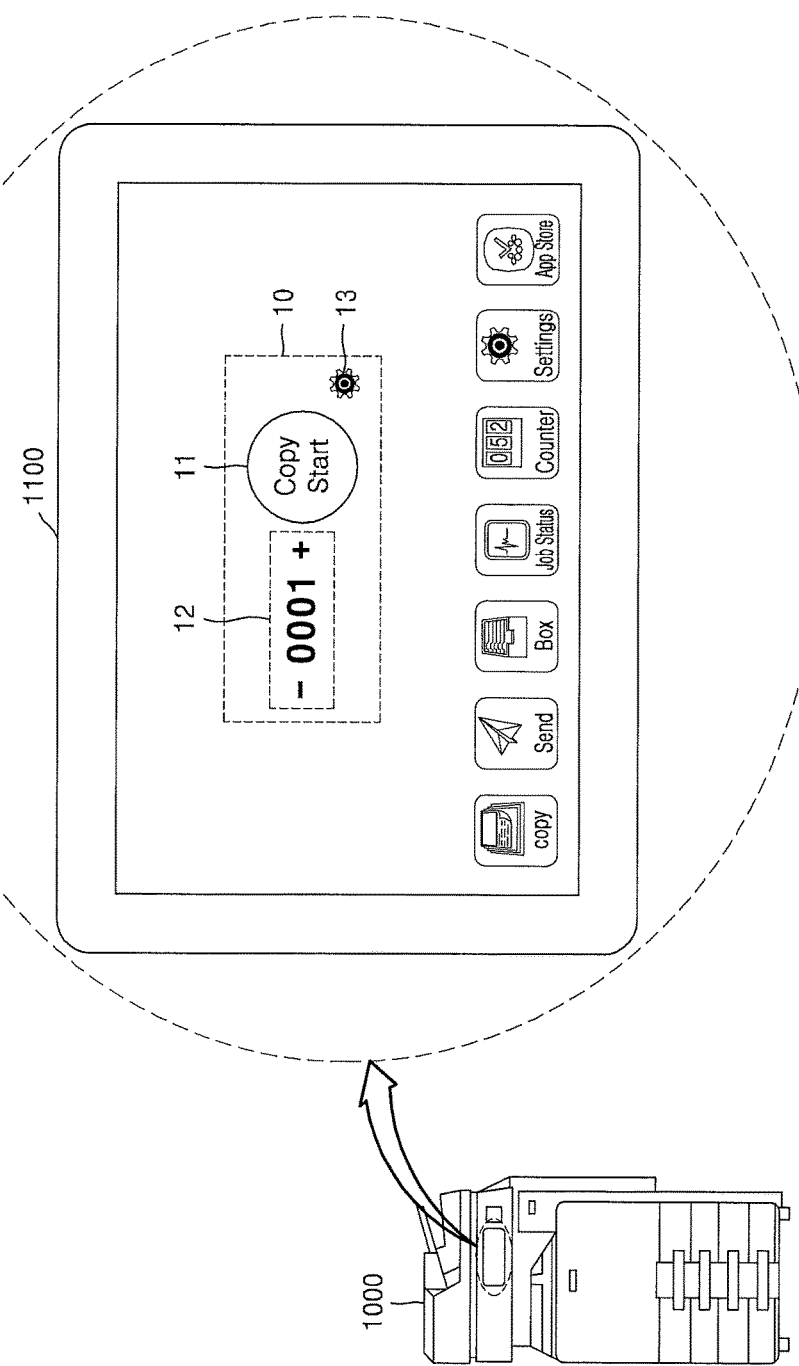
FIG. 1 illustrates an example where a widget for job performance is displayed in an operation panel of an image forming apparatus according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

FIG. 1 illustrates an example where a widget for job performance is displayed in an operation panel of an image forming apparatus according to an embodiment.

Referring to FIG. 1, a graphic user interface (GUI) screen for controlling operation of an image forming apparatus 1000 is displayed on an operation panel 1100 of the image forming apparatus 1000. Further, a widget 10, which is generated for performing a specific job, is displayed on a GUI screen. The widget of FIG. 1 is a widget for performing a copying job, and the widget 10 includes a start button 11 of a copying job, a setting display area 12 where a setting value of an option item (e.g., the number of prints) related to performance of a copying job is displayed, and a button 13 for changing the setting value. The specific method of performing a job by using the widget 10 and the method of changing the setting included in the widget 10 will be described in detail with reference to the drawings below. Further, the widget 10 may be formed in a form other than what has been illustrated in FIG. 1, and various embodiments of the widget configuration will be described later with reference to the drawings.

Figure 2:
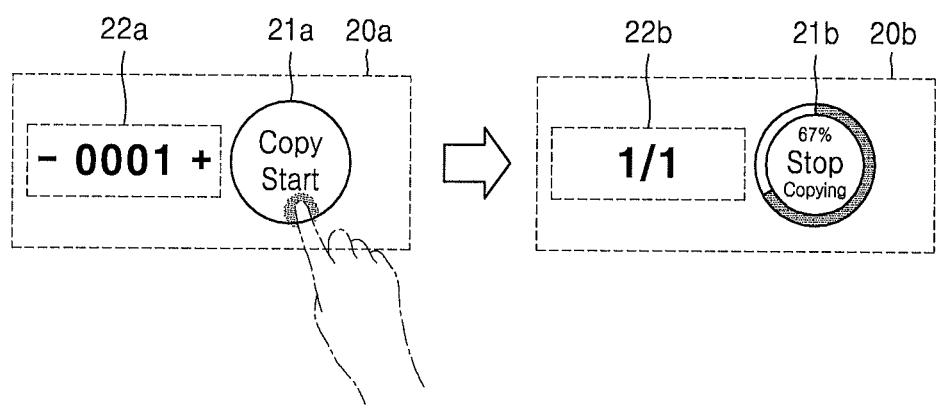
FIG. 2 illustrates an example where a copying job is started by using a widget according to an embodiment.

FIG. 2 illustrates an example where a copying job is started by using a widget according to an embodiment. A widget 20a on the left side of FIG. 2 indicates the state before a job is started, and a widget 20b on the right side indicates a state under job after the job is started.

Referring to FIG. 2, the left widget 20a includes a start button 21a of a copying job and a setting display area 22a where a setting value of an option item related to the performance of the copying job is displayed. "1", which is the setting value for the number of printed copies, is displayed on the setting display area 22a. That is, the widget 20a indicates that 1 sheet has been set to be printed.

In FIG. 2, if a user touches and selects the start button 21a of the copying job included in the left widget 20a, the image forming apparatus starts performance of a copying job according to the setting value which has been displayed in the setting display area 22a. That is, the image forming apparatus prints one printed copy.

If the job is started, the right widget 20b is displayed on the screen. A start button 21a of the copying job included in the left widget 20a is changed to a stop button 21b of the copying job included in the right widget 20b, and a progress of the job is displayed in the stop button 21b. Referring to FIG. 2, a completion rate, which indicates that the printing of 67% of pages which are being printed has been completed, is displayed on the stop button 21b. Likewise, if the job is started, the widget according to an embodiment may indicate the progress of the job. (The number of pages which are being printed/the total number of pages to be printed) is displayed on the area 22b of the right widget 20b.

Figure 3:
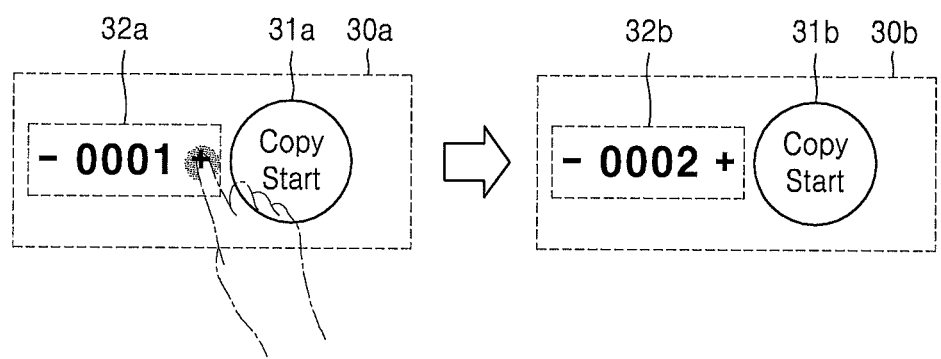
FIG. 3 illustrates an example where a setting value is changed in a widget according to an embodiment.

FIG. 3 illustrates an example where a setting value is changed in a widget according to an embodiment. A widget 30a at the left side of FIG. 3 indicates the state before the setting value is change, and the widget 30b at the right side indicates the state after the setting value is changed.

Referring to FIG. 3, the left widget 30a includes a start button 31a of the copying job and a setting display area 32a where the setting value of the option item related with the performance of the copying job is displayed. The setting value of the number of printed copies has been displayed on the setting display area 32a of the left widget 30a of FIG. 3.

Further, symbols ("−" and "+"), which can change the setting along with the setting value, are displayed on the setting display area 32a included in the left widget 30a. The user may change the setting value by touching symbols which are displayed in the setting display area 32a.

According to FIG. 3, as a result of touching symbol "+" of the setting display area 32a by the user in the left widget 30a, the setting value of the number of printed copies, which have been displayed in the setting display area 32b of the right widget 30b, has been changed to "2". Likewise, the user may change the setting value and promptly check the changed setting value in the widget by touching the symbol displayed in the widget without a need to enter a separate menu for the change of the setting value of the option item. The right widget 30b includes a start button 31b of the copying job.

Further, the widget according to an embodiment may provide a separate menu for changing the setting value of the option items related with the performance of the job, which will be described below with reference to FIG. 4.

Figure 4:
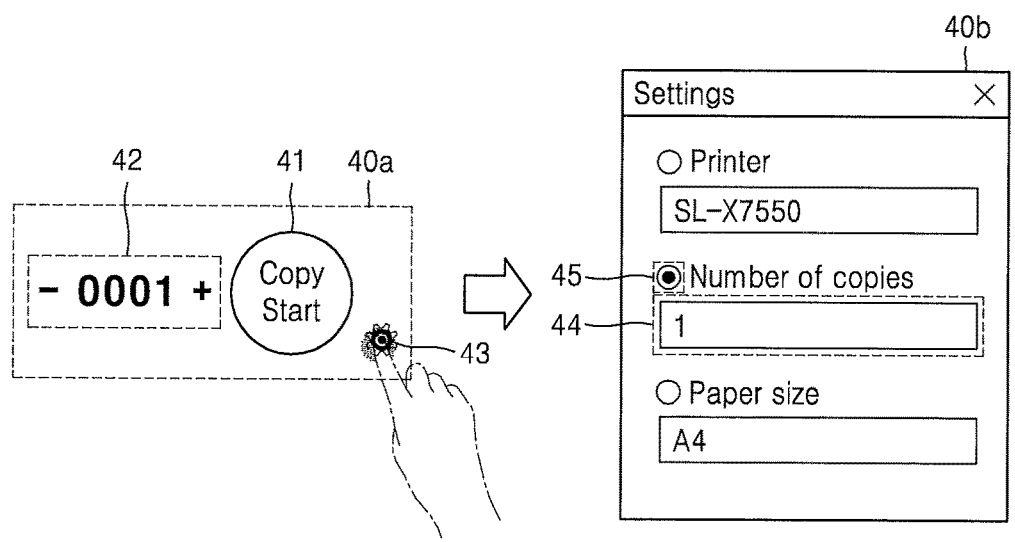
FIG. 4 illustrates an example of entering a menu for changing a setting value in a widget according to an embodiment.

FIG. 4 illustrates an example of entering a menu for changing a setting value in a widget according to an embodiment.

Referring to FIG. 4, the left widget 40a includes a start button 41 of a copying job, a setting display area 42 where the setting value of the option item related with the performance of the copying job is displayed, and a setting menu button 43. The setting menu button 43 is a button for entering the menu for changing the setting value of the option item.

If the user touches and selects the setting menu button 43 in the left widget 40a, the option setting screen 40b on the right side may be displayed. Option items, which are related with a specific job defined in the widget, i.e., the performance of the copying job, and respective setting values are displayed.

Specifically, three option items are displayed on the option setting screen 40b of FIG. 4, and these are a printer for performing a copying job, the number of copies to be printed, and the paper size of the paper sheets to be used in printing. Further, it has been displayed that the model name of the printer to perform a copying job in the option setting screen is "SL-X7550", the number of copies to be printed is "1", and the sheet size of the paper is "A4". The user may change the setting value by touching the column 44 where the setting values are displayed in the option setting screen 40b.

Further, there may be a plurality of option items which are needed to perform a certain job. However, there is a spatial limit in displaying respective setting values of the plurality of option items, and thus it may also be set that the user displays only the respective setting values for the pre-selected option items.

Referring to FIG. 4, there are three option items (printer, number of copies, and paper size) in the option setting screen 40b, but it may be seen that, from among three option items, only setting values, on which the selection column 45 has been checked, are displayed in the left widget.

Figure 5:
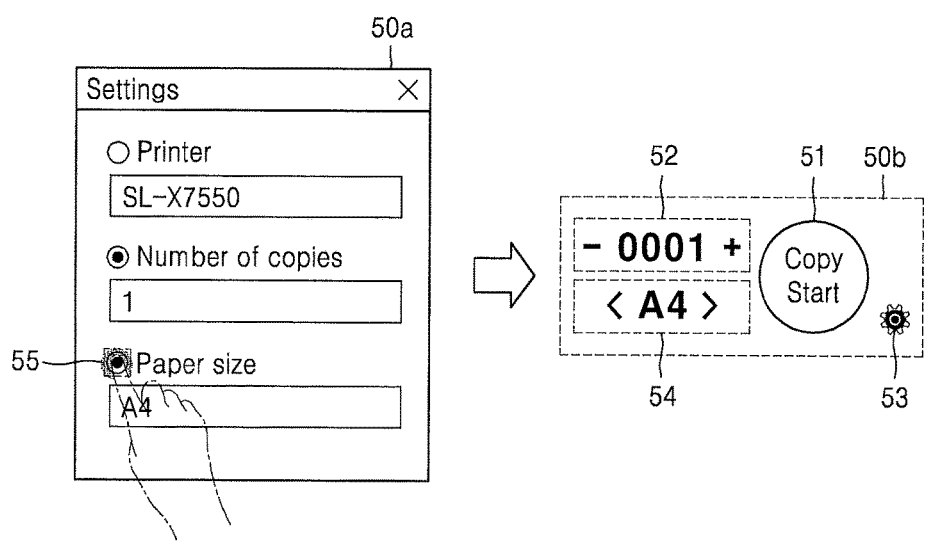
FIG. 5 illustrates an example of selecting an option item where a setting value is displayed in a widget according to an embodiment.

FIG. 5 illustrates an example of selecting an option item where a setting value is displayed in a widget according to an embodiment.

Referring to FIG. 5, the printer for performing a copying job ("Printer"), the number of copies to be printed ("Number of copies"), and the size of the printed sheet ("Paper size") have been displayed as option items. If the user touches and selects the selection column 55 of the paper size from among option items displayed in the option setting screen 50a, the right widget 50b is displayed.

The right widget 50b includes two setting display areas 52 and 54 and the setting value of the option item has been displayed in the respective setting display areas. Further, the right widget 50b may include the start button 51 and the setting menu button 53 of the copying job as in other above-described widgets. Likewise, the user may promptly check the setting value and simply change the setting value through a touch input in the widget by displaying the setting values the desired option items in the widget.

Referring to FIG. 5, there are three option items (printer, number of copies, and paper size) in the option setting screen 50a, but it may be seen that, from among three option items, only setting values, on which the selection column 55 has been checked, are displayed in the left widget.

Characteristics of the widget, which has been described with reference to FIGS. 2 to 5, will be described again by using an example of a widget which defines an image forming job (scanning job) other than the copying job.

Figure 6:
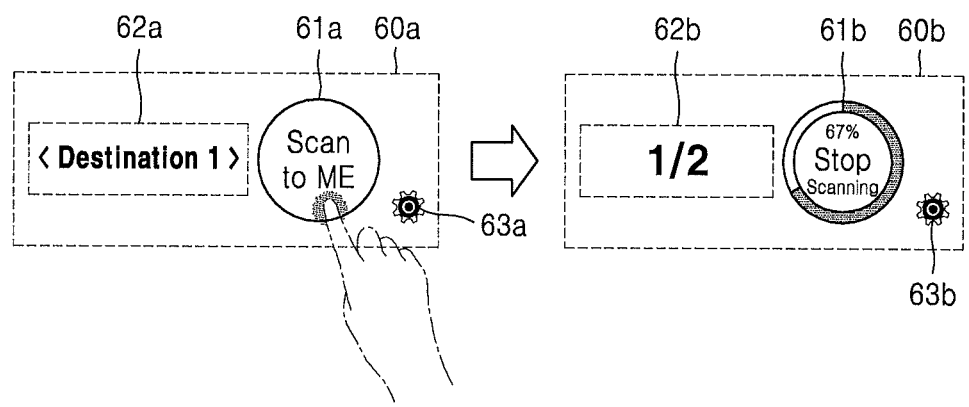
FIG. 6 illustrates an example of performing a scanning job by using a widget according to an embodiment.

FIG. 6 illustrates an example of performing a scanning job by using a widget according to an embodiment of the present. A widget 60a on the left side of FIG. 6 indicates the state before the job is started, and a widget 60b on the right side indicates the state where the job is being performed.

Referring to FIG. 6, the left widget 60a includes a start button 61a of the scanning job and a setting display area 62a where the setting value of the option item related with the performance of the scanning job is displayed. "Destination 1", which is the setting value of the destination to which the scanned image is to be transmitted, is displayed on the setting display area 62a of FIG. 6. That is, "Destination" has been set in the widget 60a as the destination for transmitting the scanned image.

If the user touches and selects the start button 61a of the scanned job included in the left widget 60a, the image forming apparatus starts the performance of the scanning job according to the setting value which has been displayed on the setting display area 62a. That is, the image forming apparatus scans a document so as to obtain a scanned image and transmits the obtained scanned image to the stored address corresponding to "Destination 1".

If the job is started, the right widget 60b is displayed on the screen. The start button 61a of the scanned job included in the left widget 60a is changed to the stop button 61b of the scanned job included in the right widget 60b after the job is started, and the progress of the job is displayed on the stop button 61b. Referring to FIG. 6, the stop button 61b displays the completion rate indicating that the scanning has been completed by 67%. Likewise, the widget according to an embodiment may indicate the progress of a job if the job is started. Further, (the number of pages which are being printed/the total number of pages to be printed) is displayed on the area 62b of the right widget 61b.

If the user touches and selects the setting menu button 63a in the left widget 60a or the setting menu button 63b in the right widget 60b, an option setting screen may be displayed. Option items, which are related with a specific job defined in the widget, i.e., the performance of the scanning job, and respective setting values may be displayed.

Figure 7:
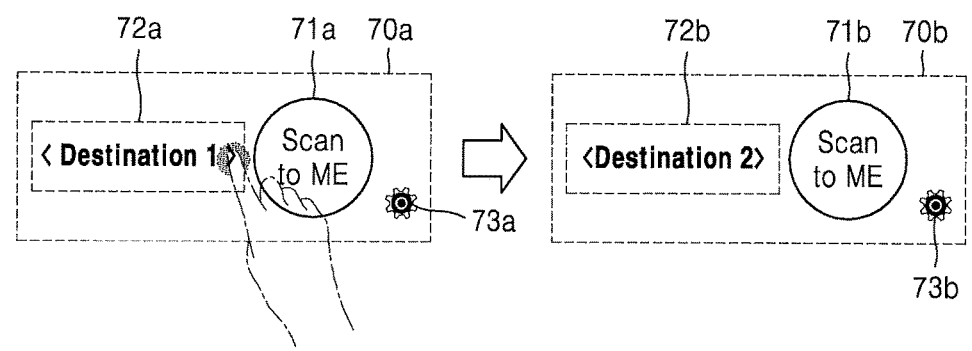
FIG. 7 illustrates an example of changing a setting value in a widget according to an embodiment.

FIG. 7 illustrates an example of changing a setting value in a widget according to an embodiment. A widget 70a on the left side of FIG. 7 indicates the state before a setting value is change and a widget 70b on the right side indicates the state after the setting value is changed.

Referring to FIG. 7, a widget 70a on the left side includes a start button 71a of the scanning job and a setting display area 72a where the setting value of the option item related with the performance of the scanning job is displayed. The transmission destination of the scanned image has been displayed on the setting display area 72b of the left widget 70a of FIG. 7. The left widget 70b includes a start button 71b of the scanning job.

Further, the symbols ("<" and ">"), which can change the setting along with the setting value, are displayed on the setting display area 72a included in the left widget 70a. The user may change the setting value by touching symbols displayed on the setting display area 72a of the widget 70a.

Referring to FIG. 7, as a result of touching symbol ">" of the setting display area 72a by the user in the left widget 70a, the transmission destination of the scanned image displayed on the setting display area 72*b* of the right widget 70*b* has been changed to "Destination 2". Likewise, the user may change the setting value by touching the symbol displayed on the widget without entering a separate menu in order to change the setting value of the option item, and promptly check the changed setting value in the widget.

If the user touches and selects the setting menu button 73*a* in the left widget 70*a* or the setting menu button 73*b* in the right widget 70*b*, an option setting screen may be displayed. Option items, which are related with a specific job defined in the widget, i.e., the performance of the copying job, and respective setting values may be displayed.

Further, the widget according to an embodiment may provide a separate menu for changing the setting value of option items related with the performance of the job, which will be described below with reference to FIG. 8.

Figure 8:
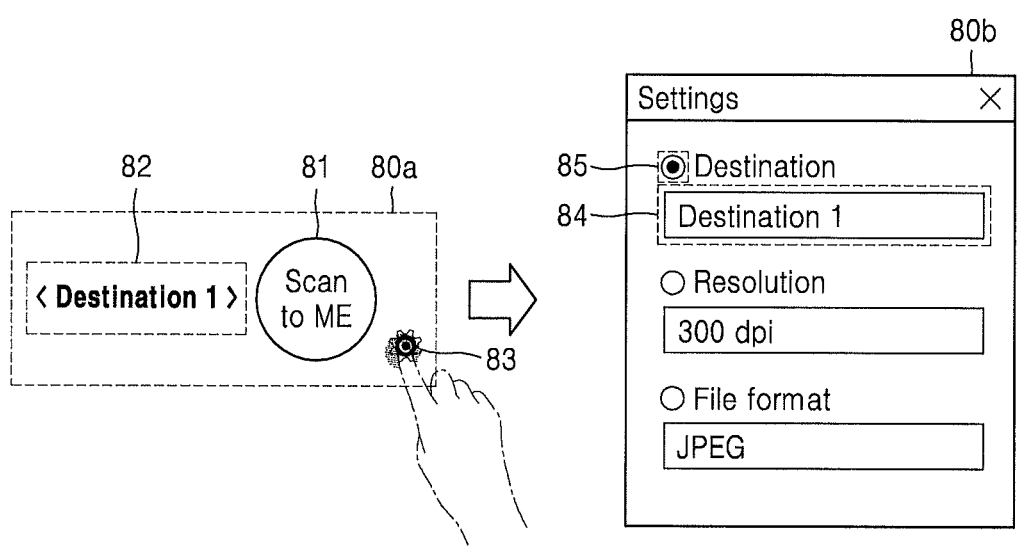
FIG. 8 illustrates an example of entering a menu for changing a setting value in a widget according to an embodiment.

FIG. 8 illustrates an example of entering a menu for changing a setting value in a widget according to an embodiment.

Referring to FIG. 8, a left widget 80*a* includes a start button 81 of a scanning job, a setting display area 82 where a setting value of option items related with the performance of the scanning job is displayed, and a setting menu button 83. The setting menu button 83 is a button form entering a menu for changing the setting value of option items.

If the user touches and selects the setting menu button 83 in the left widget 80*a*, the right option setting screen 80*b* may be displayed. Option items related with a specific job defined in the widget, i.e., the scanning job, and their respective setting values are displayed on the option setting screen 80*b*.

Specifically, three option items are displayed on the option setting screen 80*b* of FIG. 8., and they are the destination to which the scanned image is to be transmitted ("Destination"), the resolution of the scanning ("Resolution"), and the format of the file in which the scanned image is stored ("File Format"). Further, in the option setting screen 80*b*, the destination to which the scanned image is to be transmitted is "Destination 1", the resolution of the scanning is 300 dpi, and the file format for storing the scanned image is JPEG. The user may change the setting values by touching the column 84 where the setting value is displayed in the option setting screen 80*b*.

Further, there may be a plurality of option items which are needed to perform a certain job, and there is a spatial limit in displaying all of the respective setting values of the plurality of option items in the widget and thus only the setting values for the option items which have been selected by the user in advance may be set to be displayed on the widget.

Referring to FIG. 8, there are three option items (Destination, Resolution, and File format) in the option setting screen 80*b*, but only the setting values of the option items, in which the selection column 85 has been checked, from among three option items, are displayed.

Figure 9:
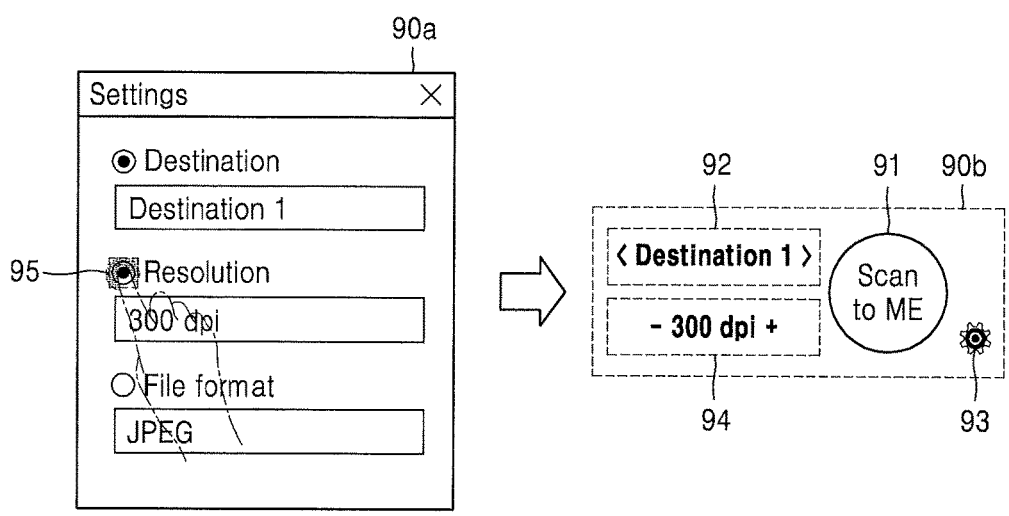
FIG. 9 illustrates an example of setting an option item where a setting value is display in a widget according to an embodiment.

FIG. 9 illustrates an example of setting an option item where a setting value is display in a widget according to an embodiment.

Referring to FIG. 9, the destination to which the scanned image is to be transmitted ("Destination"), the resolution of the scanning ("Resolution"), and the format of the file in which the scanned image is stored ("File Format") are displayed as option items in the option setting screen 90*a* which are illustrated in the left side. If the user touches the selection column 95 of "Resolution" from among the option items displayed on the option setting screen 90*a*, the right widget 90*b* is displayed.

The right widget 90*b* includes two setting display areas 92 and 94, and the setting value of the corresponding option item is displayed on each setting display area. Further, the right widget 90*b* may include the start button 91 and the setting menu button 93 of the scanning job as in the above-described other widgets. Likewise, the user may promptly check the setting values and simply change the setting values through the touch input in the widget by allowing the setting values of the desired option items to be displayed on the widget.

Hereinafter, the widgets of other forms will be described with reference to the drawings.

Figure 10:
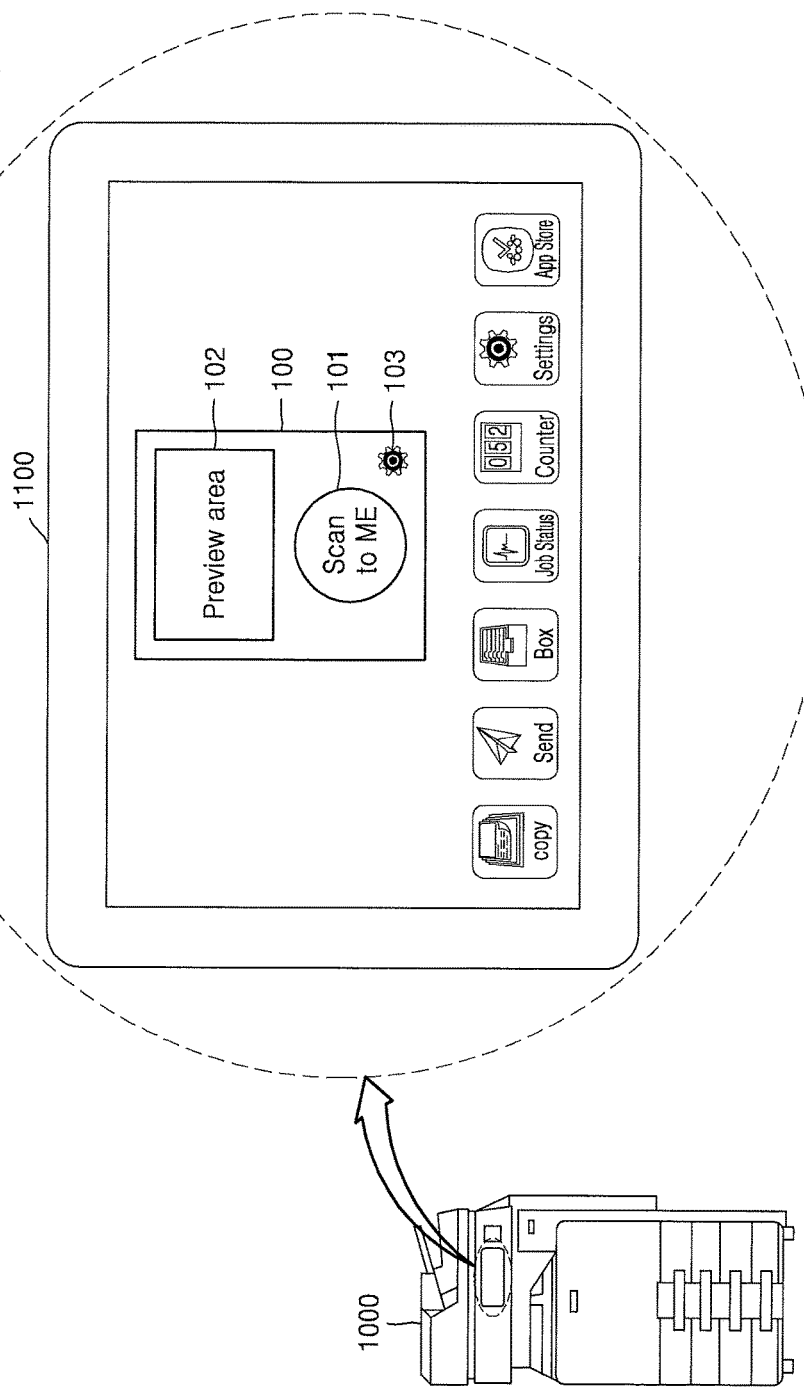
FIG. 10 illustrates an example where a widget for performing a job is displayed on an operation panel of an image forming apparatus according to an embodiment.

FIG. 10 illustrates an example where a widget for performing a job is displayed on an operation panel of an image forming apparatus according to an embodiment.

Referring to FIG. 10, the GUI screen for controlling the operation of a image forming apparatus 1000 is displayed on an operation panel 1100 of the image forming apparatus 1000, and a widget 100, which is generated for the performance of a specific job, is displayed on the GUI screen. The widget 100, which is illustrated in FIG. 10, is a widget for performing a scanning job and includes a start button 101 of a scanning job, a preview area 102 for showing the progress of the scanning job in real time, and a setting menu button 103 for entering a menu for setting option items related with performance of a scanning job. A specific method of performing a job by using a widget 100 will be described below in detail with reference to the drawings.

Figure 11:
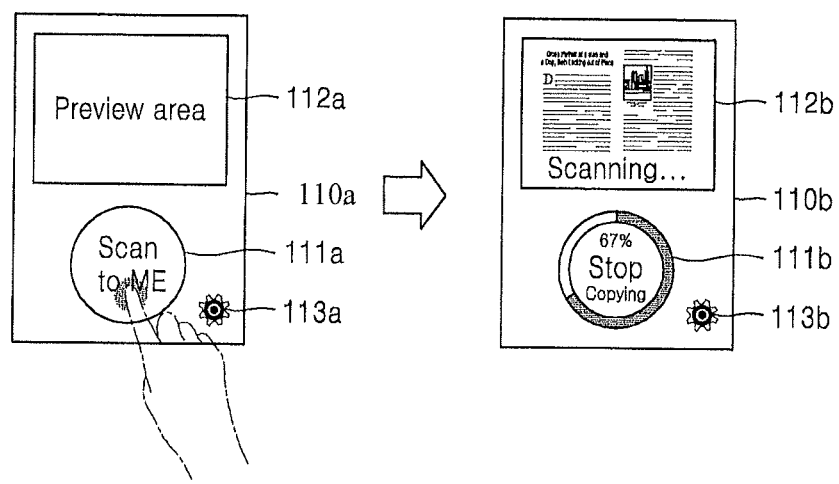
FIG. 11 illustrates an example of showing a progress situation of a job by a real time preview if a scanning job is started by using a widget according to an embodiment.

FIG. 11 illustrates an example of showing a progress situation of a job by a real time preview if a scanning job is started by using a widget according to an embodiment. The widget 110*a* on the left side of FIG. 11 indicates the state before the job is started, and the widget 110*b* on the right side indicates the state that the job is being performed.

Referring to FIG. 11, the left widget 110*a* includes a start button 111*a* of a scanning job, a preview area 112*a* for showing the progress of the scanning job in real time, and a setting menu button 113*a*. The real time preview screen is not yet displayed on the preview area 112*a* of FIG. 11 because the job has not yet been started.

In FIG. 11, if the user touches and selects the start button 111*a* of the scanning job included in the left widget 110*a*, the image forming apparatus starts the performance of the scanning job.

If the scanning job is started, the right widget 110*b* is displayed on the screen. A preview screen, which shows the progress of the scanning job in real time, is displayed on the preview area 112*b* of the right widget 110*b*. That is, a preview of a document up to a part where the scanning has been completed is displayed on the preview area 112*b*. The user may intuitively recognize the progress of the job in real time through the displayed preview.

Further, the start button 111*a* of the scanning job included in the left widget 110*a* is changed to the stop button 111*b* of the scanning job included in the right widget 110*b* after the job is started, and the progress of the job may be displayed on the stop button 111*b*. Referring to FIG. 11, the completion rate, which indicates that the printing of 67% of pages which are currently being scanned has been completed, is displayed on the stop button 111*b*.

Further, the user may set option items related with the scanning job, i.e., option items such as the transmission destination, resolution, and file format of the scanned image, may be set by selecting the setting menu button 113*a* or by selecting setting menu button 113*b*.

Further, according to an embodiment, an additional job such as image editing may be performed through a preview which has been displayed on the widget after the job is completed, which will be described below in detail with reference to FIG. 12.

Figure 12:
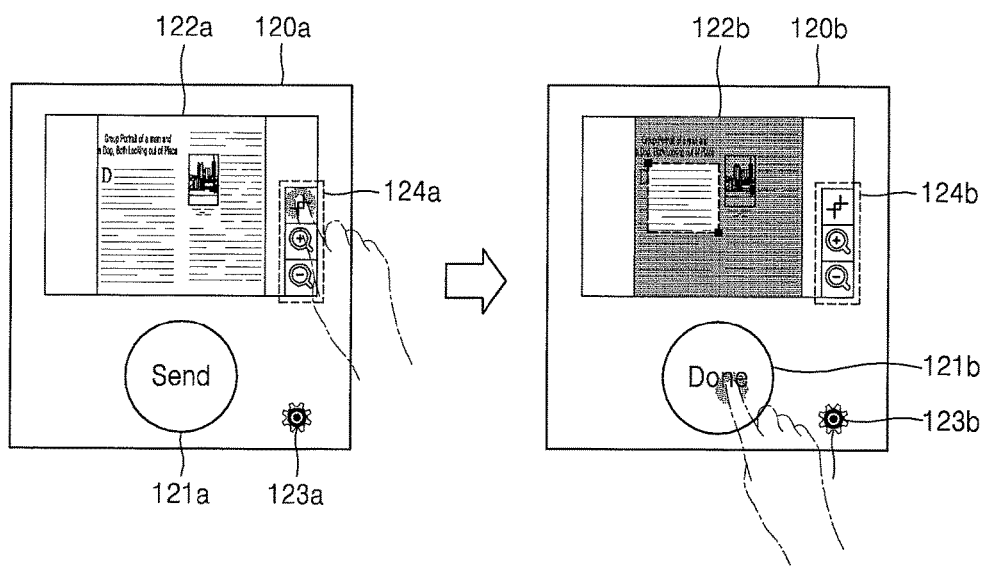
FIG. 12 illustrates an example of performing an additional job through a preview which has been displayed after completing a job in a widget according to an embodiment.

FIG. 12 illustrates an example of performing an additional job through a preview which has been displayed after completing a job in a widget according to an embodiment.

As described above, the widget 110b of the right side of FIG. 11 is displayed during the performance of the scanning job, and after the scanning job is completed, the left widget 120a is displayed.

Referring to FIG. 12, the preview of the completed scanned image is displayed in the preview area 122a of the left widget 120a. Further, the widget 120a may include a transmission button 121a and a setting menu button 123a for transmitting the obtained scanning image and may particularly include an editing button 124a for editing the scanning image.

If the scanning is completed, the user may check the preview of the scanned image displayed on the preview area 122a and may then transmit the scanned image to the desired destination by selecting the transmission button 121a if there is nothing to be changed in the scanned image. However, if the use desires to edit the scanned image, the user may perform an additional job such as extension/reduction or cropping of the scanned image displayed in the preview by using the editing button 124a.

FIG. 12 illustrates an example of cropping the scanned image. If the user selects a cropping button from among editing buttons 124 in the left widget 120a, a tool for designating the area to be cropped in the preview of the scanned image is displayed on the preview area 122b as in the right widget 120b. If the user designates the desired area and selects the completion button (done button) 121b by using the displayed tool, the designated area is cropped so as to be temporarily stored and to be displayed on the preview area 122b. In addition, the widget 120b may include a setting menu button 123b and may include an editing button 124b for editing the image in the preview area 122b.

Likewise, the user may conveniently perform an additional job such as image editing on the widget without entering a separate menu for performance of an additional job such as the editing.

Figure 13:
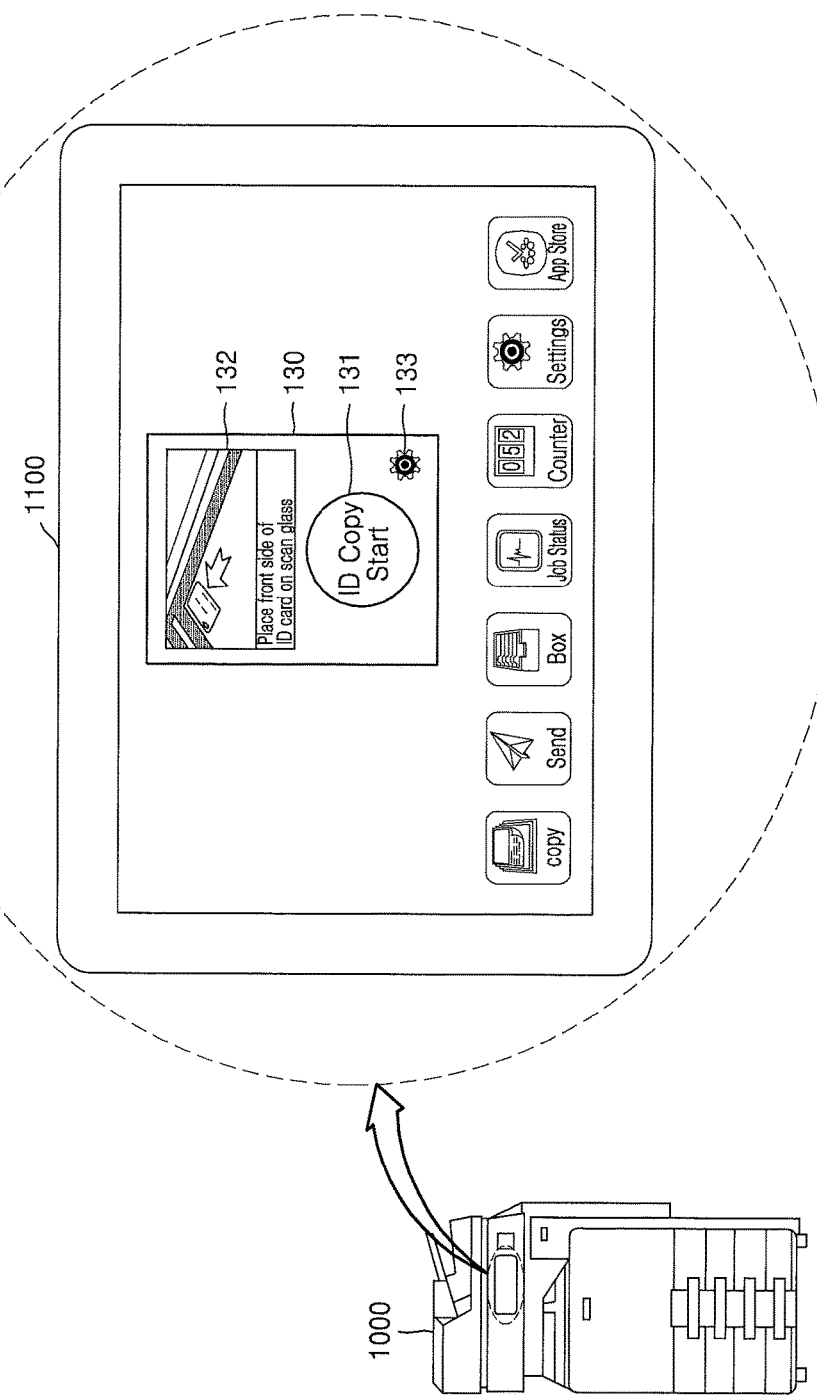
FIG. 13 illustrates an example where a widget for performing a job has been displayed on an operation panel of an image forming apparatus according to an embodiment.

FIG. 13 illustrates an example where a widget for performing a job has been displayed on an operation panel of an image forming apparatus according to an embodiment.

Referring to FIG. 13, a GUI screen for controlling the operation of the image forming apparatus is displayed on the operation panel 1100 of the image forming apparatus 1000, and a widget 130, which is generated for the performance of a specific job, is displayed on the GUI screen. The widget 130, which is illustrated in FIG. 13, is a widget for performing an ID copying job, and the widget 130 includes a start button 131 of an ID copying job, a preview area 132 for showing the progress of an ID copying job, and a setting menu button 133 for entering a menu for setting option items related with the performance of an ID copying job. The specific method of performing a job using the widget 130 will be described below in detail with reference to the drawings.

Figure 14:
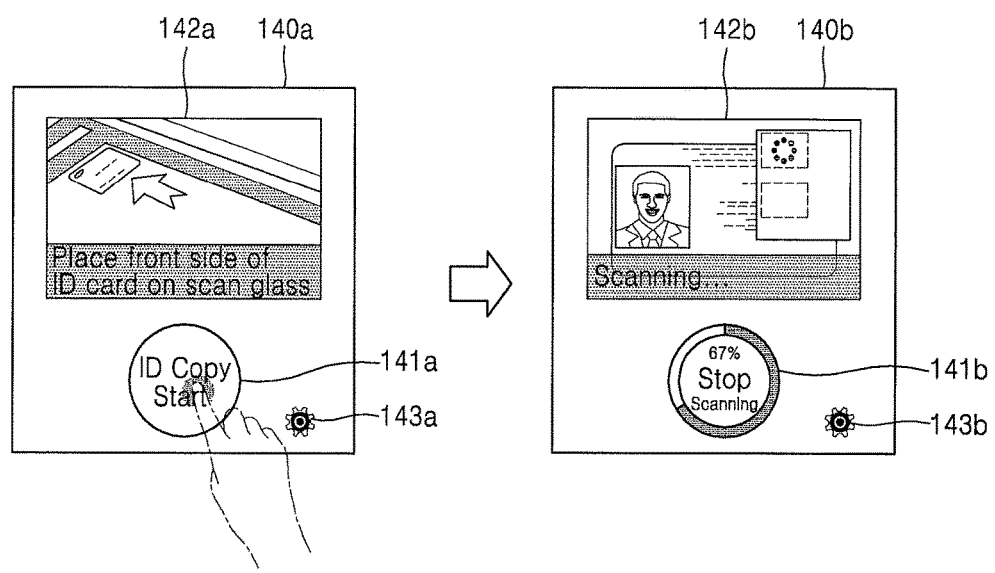
FIGS. 14 to 16 illustrate an example of performing an ID copying job according to a guide screen which has been displayed on a widget according to an embodiments.
Figure 15:
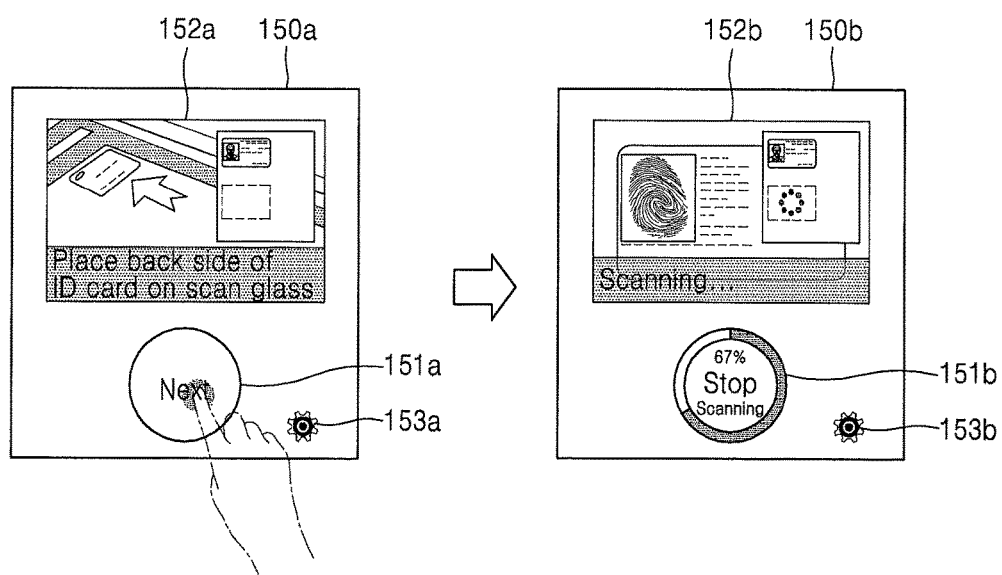
Figure 16:
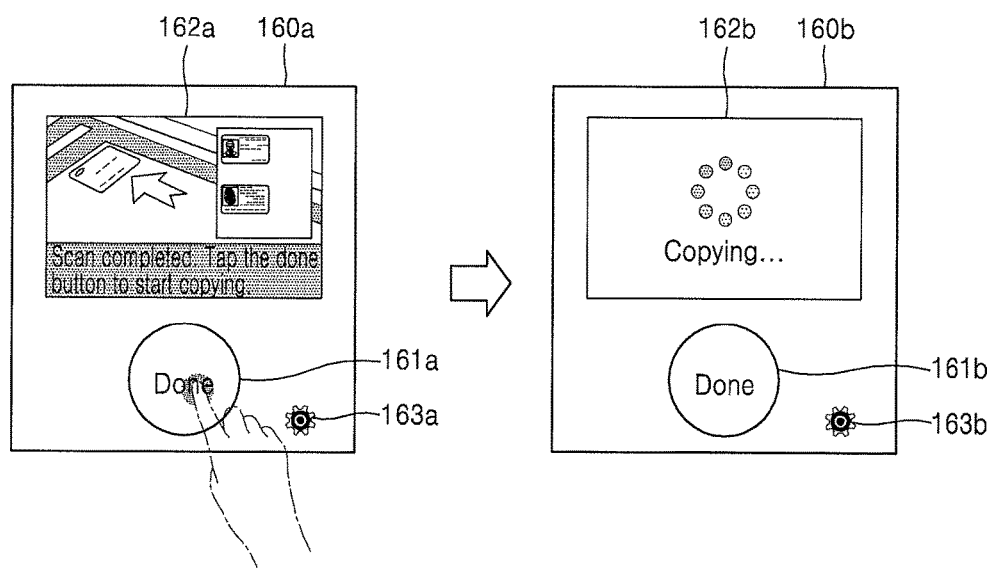

FIGS. 14 to 16 illustrate an example of performing an ID copying job according to a guide screen which has been displayed on a widget according to an embodiment. That is, the widgets illustrated in FIGS. 14 to 16 are displayed in order in the screen in the process of performing an ID copying job.

Referring to FIG. 14, the screen of guiding the method of performing an ID copying job is displayed on the guide display area 142a of the left widget 140a. At this time, the guide screen where the guide display area 142a is displayed includes an image corresponding to the text which says that the front side of the ID card needs to be positioned on the scan glass. The user may check the method of performing the ID copying job through the guide screen which is displayed on the guide display area 142a. The guide screen may include at least one of images or texts which guide the method of performing the job.

Further, the widget 140a may include a start button 141a and a setting menu button 143a of an ID copying job as in the above-described widgets, and as illustrated in FIG. 14, after the user positions the ID card in the scan glass according to the guide screen, if the user selects the ID copying job start button 141a, the right widget 140b is displayed on the screen.

The guide screen or preview, which shows the progress of the front scanning job of the ID card in real time, may be displayed on the guide display area 142a. The guide screen, which indicates that the front side of the ID card is being scanned, is displayed on the guide display area 142b of the widget 140b. That is, before the scanning job for the front side of the ID card is started, the screen of guiding the method of performing the front scanning job of the ID card is displayed on the guide display area 142a of the left widget 140a, and if the job is started, the guide screen or preview, which shows the progress of the job in real time, may be displayed on the guide display area 142b of the right widget 140b.

The start button 141a of the ID copying job included in the left widget 140a is changed to the stop button 141b of the ID copying job included in the right widget 140b after the job is started, and the progress of the job may be displayed on the stop button 141b. Referring to FIG. 14, the completion rate, which indicates that 67% of the scanning of the front side of the current ID card has been completed, is displayed on the stop button 141b. In addition, the widget 142b may include a setting menu button 143b.

Further, a guide screen, which is needed according to the performance operation of the job, may be appropriately displayed on the guide display area of the widget. That is, if the job executed by the widget is composed of two or more operations, when one of the operations is completed, the guide screen on the next operation may be displayed on the widget, which will be described with reference to FIGS. 15 and 16.

If the scanning on the front side of the ID card is completed, the next operation, i.e., the guide screen for the scanning of the rear side of the ID card, is displayed on the guide display area 152a as in the widget 150a of the left side of FIG. 15. The guide screen contains a corresponding image along with the text indicating to position the rear side of the ID card on the scan glass.

The widget 150a includes a next button 151a for going to the next operation. If the user positions the rear side of the ID card on the scan glass according to the guide screen which is displayed on the guide display area 152a and selects the next button 151a, the widget 150b of the right side of FIG. 15 is displayed on the screen as the scan job on the rear side of the ID card is started.

The guide screen or preview, which shows the progress of the scanning job of the rear side of the ID card, may be displayed on the guide display area 152b of the widget 150b of the right side. The guide screen, which indicates that the rear side of the ID card is being scanned, has been displayed on the guide display area 152b of the widget 150b of FIG. 15. That is, before the scanning job on the rear side of the ID card is started, the screen, which guides the method of performing a scanning job of the ID card, has been displayed on the guide display area 152*b* of the left widget 150*a* , but if the job is started, the guide screen or preview, which shows the progress of the job in real time, may be displayed on the guide display area 152*b* of the right widget 150*b*.

The next button 151*a* included in the left widget 150*a* is changed to the stop button 151*b* of the ID copying job included in the right widget 150*b* after the job is started, and the progress of the job may be displayed in the stop button 151*b*. Referring to FIG. 15, the completion rate, which indicates that 67% of the scanning of the rear side of the ID card has been completed, has been displayed on the stop button 151*b*.

If the user touches and selects the setting menu button 153*a* in the left widget 150*a* or the setting menu button 153*b* in the right widget 150*b* , an option setting screen may be displayed. Option items, which are related with a specific job defined in the widget, i.e., the performance of the ID copying job, and respective setting values may be displayed.

Referring to FIG. 16, the guide screen, which indicates that the scanning of the front and rear dies of the ID card has been completed, has been displayed on the guide display area 162*a* of the left widget 160*a* , and the guide text, which indicates to select the completion button 161*a* in order to start copying because the scanning has been completed, has displayed on the guide screen.

If the user selects the completion button 161*a* according to the guide, the screen, which guides that the copying job is being performed, is displayed on the guide display area 162*b* as in the right widget 160*b* , and the completion button (done button)161*b* is deactivated.

If the user touches and selects the setting menu button 163*a* in the left widget 160*a* or the setting menu button 163*b* in the right widget 160*b* , an option setting screen may be displayed. Option items, which are related with a specific job defined in the widget, i.e., the performance of the ID copying job, and respective setting values may be displayed FIG. 17 illustrates an example of entering a menu for changing a setting value in a widget according to an embodiment.

Figure 17:
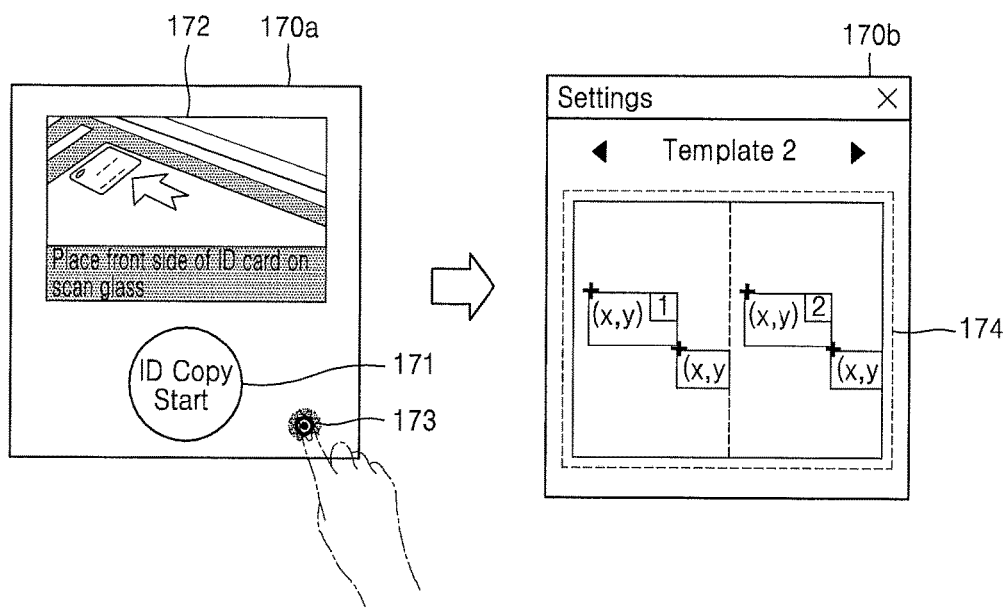
FIG. 17 illustrates an example of entering a menu for changing a setting value in a widget according to an embodiment.

Referring to FIG. 17, the left widget 170*a* includes a start button 171 for starting the ID copying job, a guide display area 172 where the guide screen related with the performance of the ID copying job is displayed, and a setting menu button 173 for entering a menu which sets options related with the performance of the ID coping job.

If the user selects the setting menu button 173, an option setting screen 170*b* shown in the right side of FIG. 17 may be displayed. A template 174 for setting options needed in the performance of a specific job defined in the widget 170*a* , i.e. the ID copying job, is displayed in the option setting screen 170*b* . The user may set options for performing ID copying by selecting one of pre-stored templates.

Hereinafter, methods of performing jobs by using the widget according to embodiments will be described with reference to flowcharts.

Figure 18:
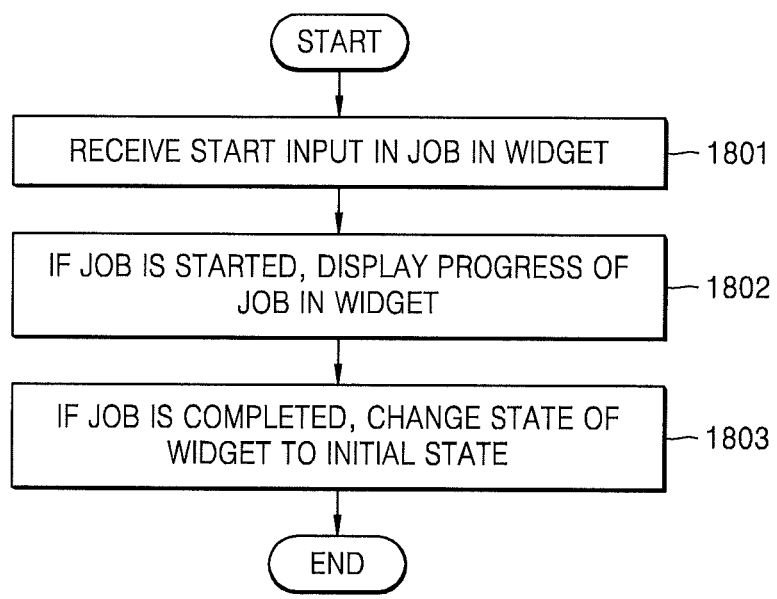
FIGS. 18 to 20 are flowcharts illustrating a method of performing a job by using a widget according to embodiments.
Figure 19:
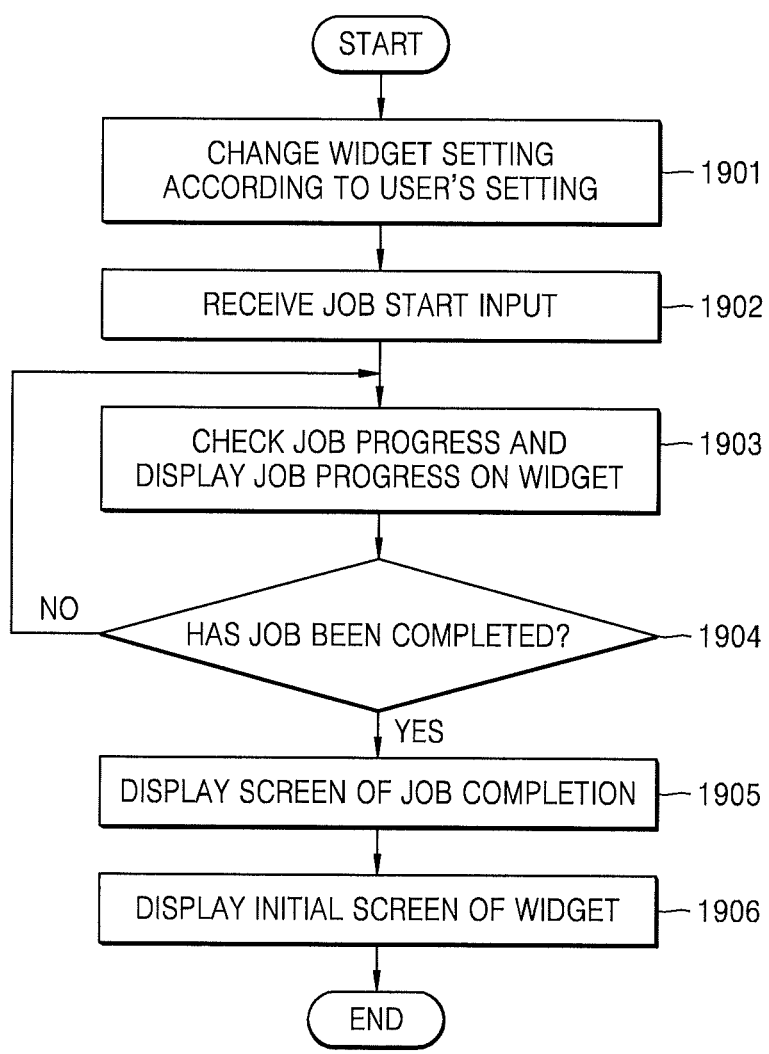
Figure 20:
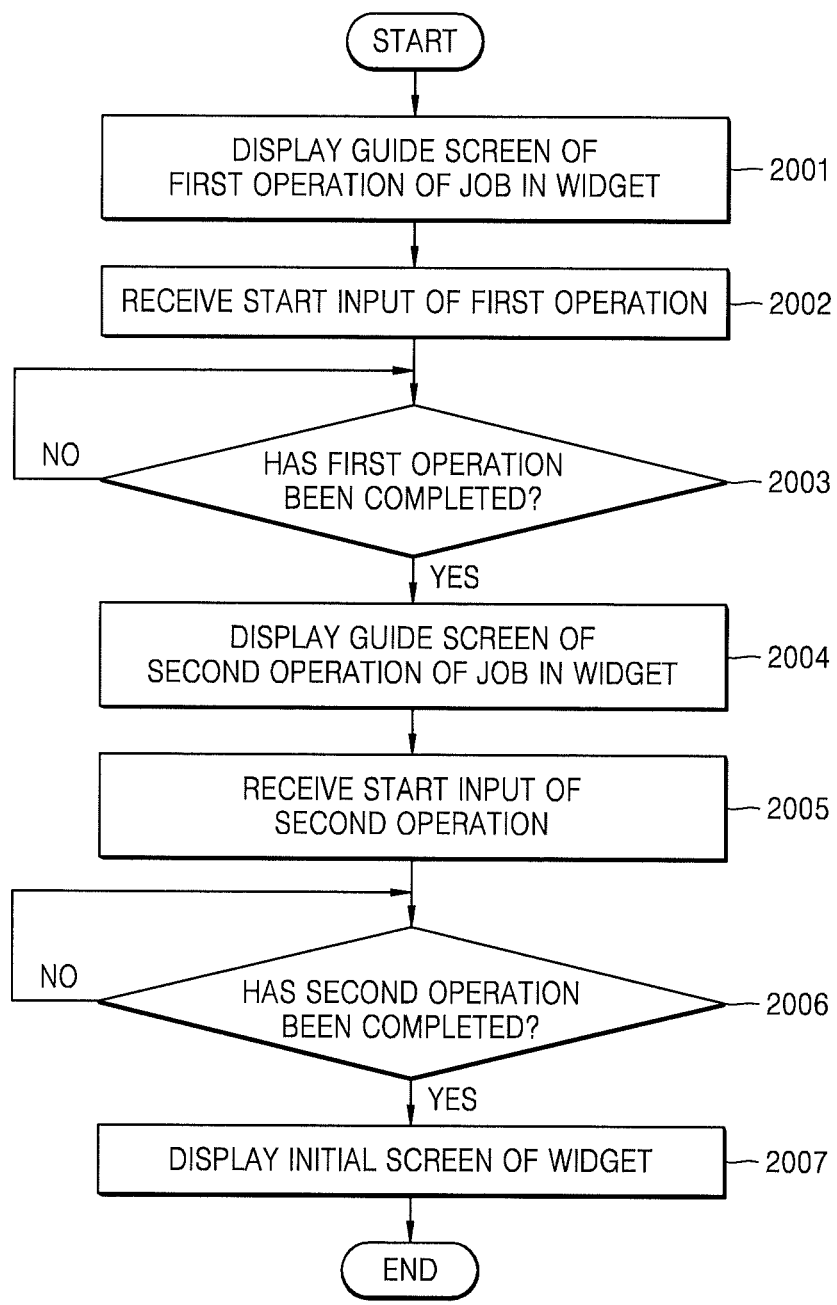

FIGS. 18 to 20 are flowcharts illustrating a method of performing a job by using a widget according to embodiments.

Referring to FIG. 18, in operation 1801, an image forming apparatus receives a start input of a job in the widget. The widget may include a start button for starting a specific job defined in the widget and may receive a start input of the job by touching the start button by the user.

In operation 1802, if the job is started, the image forming apparatus displays the progress of the job in the widget. The method of displaying the progress of the job in the widget may be implemented in various manners, and as described above, the start button is changed to the stop button and the completion rate of the job may be displayed on the stop button, or a preview showing the progress of the job may be displayed in the widget in real time. Further, the progress may be displayed in a scheme which displays the guide screen, which fits the current operation of the job, in the widget.

In operation 1803, if the job is completed, the image forming apparatus changes the state of the widget to the initial state.

Further, FIG. 19 illustrates a specified flowchart of the flowchart of FIG. 18.

Referring to FIG. 19, in operation 1901, the image forming apparatus changes the setting of the widget according to the user's input. The setting of the widget may be promptly changed by touching a symbol for the change of the setting which is displayed on the widget as described above, or may be changed by entering a menu for changing the setting by selecting the setting menu change button included in the widget.

In operation 1902, the image forming apparatus receives a start input of the job in the widget. The widget may include a start button for starting a specific job which is defined in the widget and receive a start input of a job by touching the start button by the user.

In operation 1903, the image forming apparatus checks the progress of the job and displays the progress on the widget. The method of displaying the progress of the job on the widget may be implemented in various manners. As described above, the start button may be changed to the stop button and then the completion rate of the job may be displayed on the stop button, or a preview showing the progress of the job may be displayed on the widget. Further, the progress may be displayed in a manner that displays the guide screen according to the current operation of the job on the widget.

In operation 1904, the image forming apparatus determines whether the job has been completed. If not completed, the process returns to operation 1903 and the image forming apparatus checks the progress of the job again and displays the progress on the widget. In contrast, if completed, the process proceeds to operation 1905 and the image forming apparatus displays the job completion screen on the widget.

In operation 1906, the image forming apparatus may perform a new job by displaying the initial screen of the widget.

Further, if the job defined in the widget is composed of two or more operations, an example of displaying the guide screen according to the job performance operation will be described with reference to the flowchart of FIG. 20. It is assumed that the job is composed of first and second operations for the convenience of explanation.

In operation 2001, the image forming apparatus displays the guide screen of the first operation of the job in the widget. The guide screen may include at least one of the text and the image which guide the method of performance of the first operation.

In operation 2002, the image forming apparatus receives the start input of the first operation in the widget. The widget may include the start button for the start of the first operation and the user may receive the start input by selecting the start button.

In operation 2003, the image forming apparatus determines whether the first operation has been completed. As a result of determination, if the first operation has not been completed, the image forming apparatus determines whether the operation has been completed, and if has been completed, the process proceeds to operation 2004.

In operation 2004, the image forming apparatus displays the guide screen of the second operation of the job in the widget. The guide screen may include at least one of the text and the image which guide the performance method of the second operation.

In operation 2005, the image forming apparatus receives the start input of the second operation in the widget. The widget may include the start button for the start of the second operation and the user may receive the start input by selecting the start button.

In operation 2006, the image forming apparatus determines the second operation has been completed. As a result of the determination, if has not been completed, the image forming apparatus determines again whether has been completed, and if has been completed, the process proceeds to operation 2007.

In operation 2007, the image forming apparatus may perform a new job by displaying the initial screen of the widget.

Figure 21:
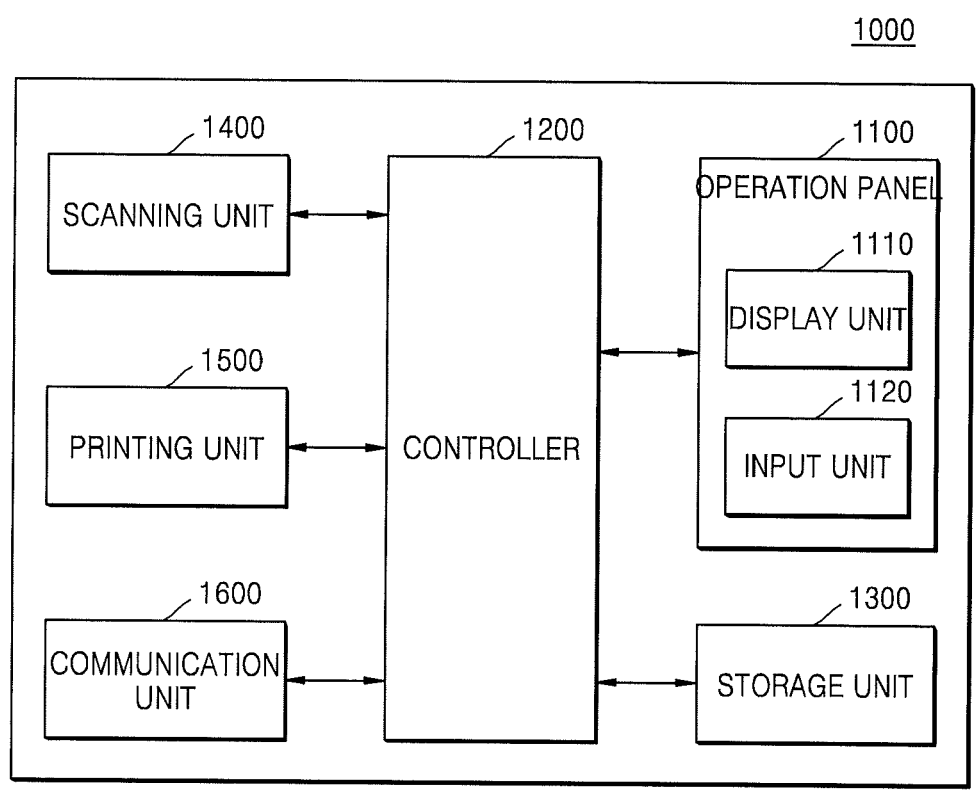
FIG. 21 is a block diagram illustrating a configuration of an image forming apparatus according to an embodiment.

FIG. 21 is a block diagram illustrating a configuration of an image forming apparatus according to an embodiment. Hereinafter, the role, which is performed by each component of the image forming apparatus, in executing the method of performing the job which uses the above-described widget, will be described.

The image forming apparatus 1000 according to an embodiment includes an operation panel 1100, a controller 1200, a storage unit 1300, a scanning unit 1400, a printing unit 1500, and a communication unit. Further, the operation panel 1100 may include a display unit 1110 and an input unit 1120.

The operation panel 1100 displays a screen for controlling the operation of the image forming apparatus 1000 and receives a user's input. The display unit 1110 is composed an LCD panel, etc. and a GUI screen for operation control of the image forming apparatus 1000 may be displayed on the display unit 1110. The input unit 1120 is composed of a touch screen, a hard button, etc. and may receive a user's input for controlling the operation of the image forming apparatus 1000. The widget, which has been described up to now, is displayed on the GUI screen which is displayed on the display unit 1110.

The controller 1200 is a component for controlling the operation of the image forming apparatus and is composed of a processor, etc. Specifically, the image forming apparatus 1000 may separately include a processor of an UI terminal for performing control of the GUI screen displayed on the display unit 1110, etc., and a processor for performing the operation control of the scanning unit 1400 and the printing unit 1500. It is assumed that the controller 1200 of FIG. 21 includes both processors. In the embodiments which have been described up to now, all of the roles of performing the job according to a touch input in the widget, displaying the progress of the job on the widget, and displaying the guide screen for the performance method of the job on the widget are performed by the controller 1200. That is, both the operation control of the image forming apparatus 1000 according to the input which is received in the widget and the display control of the widget according to the situation are performed by the controller 1200.

The storage unit 1300 may be composed of memories such as HDD and RAM for storing data. A widget, which is generated to correspond to a specific job, and setting values included in the widget may be stored in the storage unit 1300.

The scanning unit 1400 is a component for performing a scanning job and the printing unit is a component for performing a printing job and both the scanning 1400 and the printing unit 1500 are operated according to the control of the controller 1200.

The communication unit 1600 is a component for performing communication and transmits a scanned image to a designated transmission destination.

As described above, according to the one or more of the above exemplary embodiments, if a job is started by using a widget, a progress of a job is displayed on the widget, and thus the user may quickly and intuitively recognize the progress of the job through the widget.

Processes, functions, methods, and/or software in apparatuses described herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed:

1. A method comprising:
   displaying a widget, in a first state, on a display of an image forming apparatus, the widget including a first button to start a job in the image forming apparatus and a preview area adjacent to the first button to display in real time progress of the job being performed by the image forming apparatus;

receiving a selection of the first button to start the job;

in response to receiving the selection of the first button to start the job:

providing a control signal to start the image forming apparatus to perform the job, receiving information regarding a progress of the job being performed by the image forming apparatus, changing the widget to a second state by changing the first button to a second button that displays the progress of the job by displaying a completion rate of the lob on the second button while the job is being performed by the image forming apparatus, and displaying, in the preview area included in the widget, a preview screen which includes an image of a document corresponding to the job that reflects in real time progress of the job being performed by the image forming apparatus with respect to the document; and in response to the job being completed by the image forming apparatus, changing the widget to another state by changing the second button back to the first button, wherein the job includes at least one of a copy operation, a printing operation, or a scanning operation of the image forming apparatus.

2. The method of claim 1, wherein
the second button that displays the progress of the job also stops the job when selected, and
the second button displays the progress of the job by displaying the completion rate of the job in numeric characters in a central portion of the second button and by displaying a completion rate of the job using a progress bar circumferentially provided at an outer ring of the second button.

3. The method of claim 1, wherein the widget includes a setting display area of a setting value of an option item related with the performance of the job.

4. The method of claim 3, wherein if the setting display area included in the widget is touched, the setting value is changed.

5. The method of claim 3, wherein the widget further includes a menu button for entering a menu for changing the setting value.

6. The method of claim 1, wherein the widget includes a setting display area and a setting value for at least one option item which has been selected in advance from among a plurality of option items related with the performance of the job which is displayed on the widget.

7. The method of claim 1, wherein the widget further includes a guide screen where at least one of an image or a text which guides the performance of the job is displayed.

8. The method of claim 7, wherein, when the job includes at least two operations, if one of the operations of the job is completed, at least one of the image or the text which guides performance of a next operation of the job is displayed on the guide screen.

9. The method of claim 1, wherein
the job includes the scanning operation,
the preview screen includes a first scanned image of a portion of the document that reflects the portion of the document scanned by the image forming apparatus at a point in time when the scanning operation is partially completed, and
the preview screen includes a second scanned image of the entire document that reflects the document entirely scanned by the image forming apparatus at a point in time when the scanning operation is completed.

10. The method of claim 1, wherein in response to the job being completed by the image forming apparatus with respect to the document, the method further comprises:

displaying, in the preview area, the preview screen including the image of the document corresponding to the job that reflects completion of the job performed by the image forming apparatus with respect to the document; and displaying, in the preview area included in the widget, a third button to perform an additional job on the image of the document included in the preview screen.

11. At least one non-transitory computer readable medium storing computer readable instructions which when executed control at least one processor to implement the method of claim 1.

12. An image forming apparatus comprising:
an operation panel having a display:
to display a widget in a first state, the widget including a first button to start a job and a preview area adjacent to the first button to display in real time progress of a job being performed by the image forming apparatus,
to receive a selection of the first button to start the job,
in response to receiving the selection of the first button, to change the widget to a second state by changing the first button to a second button that displays a progress of the job by displaying a completion rate of the job on the second button while the job is being performed by the image forming apparatus, and by displaying, in the preview area included in the widget, a preview screen which includes an image of a document corresponding to the job that reflects in real time progress of the job being performed by the image forming apparatus with respect to the document, and
in response to the job being completed by the image forming apparatus, to change the widget to another first state by changing the second button back to the first button;
a controller to provide a control signal to start the image forming apparatus to perform the job based on the selection of the first button and to receive information regarding the progress of the job being performed by the image forming apparatus; and
at least one of a scanner, printer, or communication device to perform the job according to the controller,
wherein the job includes at least one of a copy operation, a printing operation, or a scanning operation of the image forming apparatus.

13. The image forming apparatus of claim 12, wherein:
the controller is to control the display to change the first button for the start of the job to the second button,
the second button is to stop the job when selected, and
the controller is to control the display to display the progress of the job on the second button by displaying the completion rate of the job in numeric characters in a central portion of the second button and by displaying a completion rate of the job using a progress bar circumferentially provided at an outer ring of the second button.

14. The image forming apparatus of claim 12, wherein the controller is to control the display to display a setting value of an option item related with the performance of the job on the widget.

15. The image forming apparatus of claim 14, wherein the controller is to change the setting value when an area where the setting value displayed on the widget is touched.

16. The image forming apparatus of claim 12, wherein:
the controller is to control the display to display a setting value for at least one option item; and
the controller is to control the display to display the setting value for the at least one option item which has been selected in advance from among a plurality of option items related with the performance of the job on the widget.

17. The image forming apparatus of claim 12, wherein the controller is to control the display to display a guide screen including at least one of an image or a text which guides the performance of the job on the widget.

18. The image forming apparatus of claim 17, wherein, when the job includes two or more operations, if one of the operations is completed, the controller is to control the display to display a guide screen including at least one of an image or a text which guides the performance of a next operation of the job on the widget.

19. The image forming apparatus of claim 12, wherein the job includes the scanning operation,
the preview screen includes a first scanned image of a portion of the document that reflects the portion of the document scanned by the image forming apparatus at a point in time when the scanning operation is partially completed, and
the preview screen includes a second scanned image of the entire document that reflects the document entirely scanned by the image forming apparatus at a point in time when the scanning operation is completed.

20. The image forming apparatus of claim 12, wherein in response to the lob being completed by the image forming apparatus with respect to the document, the display is to display, in the preview area, the preview screen including the image of the document corresponding to the job that reflects completion of the job performed by the image forming apparatus with respect to the document, and to display, in the preview area included in the widget, a third button to perform an additional job on the image of the document included in the preview screen.

* * * * *

UNITED STATES PATENT AND TRADEMARK OFFICE
CERTIFICATE OF CORRECTION

PATENT NO. : 10,298,786 B2
APPLICATION NO. : 14/790320
DATED : May 21, 2019
INVENTOR(S) : Kwang-soo Ha It is certified that error appears in the above-identified patent and that said Letters Patent is hereby corrected as shown below:

In the Claims

In Column 15, Line 15, Claim 1, delete "lob" and insert -- job --, therefor.

In Column 18, Line 15, Claim 20, delete "lob" and insert -- job --, therefor.

Signed and Sealed this
Thirtieth Day of July, 2019

Andrei Iancu
*Director of the United States Patent and Trademark Office*